United States Patent Office 3,058,834
Patented Oct. 16, 1962

3,058,834
PROCESS OF MAKING BASIC REFRACTORY AND BASIC REFRACTORY COMPOSITION
Joseph N. Koehegyi, 310 Riverside Drive, New York, N.Y.
No Drawing. Filed Nov. 17, 1959, Ser. No. 853,439
1 Claim. (Cl. 106—59)

The present invention relates to basic refractory materials and to processes of making the same.

The present invention is a continuation-in-part of my copending application Serial No. 836,246, filed August 26, 1959, for Process of Making Basic Refractory and Basic Refractory Composition, now abandoned.

A purpose of the invention is to produce a relatively inexpensive highly refractory material from calcined dolomite or calcined lime, and to protect against destructive reaction by moisture and by carbon dioxide particularly at low temperatures during periods of cooling of the refractory, as for example when a furnace discharges or when the lining is repaired.

A further purpose is to provide fine particles which are placed in the voids of a calcined dolomite or calcined lime refractory mass, which mass consists of coarse particles, and which fine particles tend to restrict diffusion of moisture and of carbon dioxide, and also protect surfaces of the coarse calcined dolomite or calcined lime particles from reaction with gas and air which contain moisture or carbon dioxide or both.

A further purpose is to strengthen refractories consisting of coarse particles of calcined dolomite or calcined lime by placing in the voids refractory fine particles.

A further purpose is to fuse or sinter the fine particles in the refractory bodies, like brick and shapes, at a preparatory firing of them, without fusing the coarse refractory mass, and to utilize the refractory at a temperature below the temperature of fusion of the fine refractory particles.

A further purpose is to dead-burn dolomite or lime, optionally to mold the dead-burned dolomite or lime, permissibly after mixing with a bonding material, optionally to fuse or sinter the dolomite or lime, to break down the material into coarse particles, and then to mix the coarse particles with fine particles of the class consisting of oxides of aluminum, chromium, manganese and titanium.

A further purpose is to coat the refractory brick with a moisture and carbon dioxide impervious layer, preferably of vitrified water glass, but permissibly of a moisture impervious sheet material such as aluminum foil, tin foil, polyvinyl chloride, polyethylene or the like.

Further purposes appear in the specification and in the claims.

Large deposits of dolomite and of limestone exist in various parts of the world. These materials when calcined have high melting points, particularly if they are not contaminated, and for that reason they have desirable properties for refractory bricks, shapes, tamped furnace bottoms and the like, but they are subject to difficulty especially because they react with moisture and with carbon dioxide at low temperatures, tending to disrupt the refractory structure before it is put into use and if it must undergo repeated cycles of heating and cooling.

The present invention contemplates producing refractory bodies which may be either bricks or other similar shapes, or tamped structures such as furnace linings, all of which are more resistant against moisture and carbon dioxide attack at low temperatures.

The invention also produces refractory bodies which are stronger at elevated temperature because of the benefit obtained by introducing in the voids between the coarse particles a highly refractory protecting material, which is preferably but not necessarily preliminarily sintered before coming into use, or fused into a network of protecting material.

In accordance with the invention, fine particles of alumina, chromium oxide, manganese oxide, or titanium oxide, or admixtures thereof, are mixed with coarser particles of calcined dolomite or calcined lime, so that the fine particles tend to restrict diffusion of moisture or of carbon dioxide, which would otherwise attack the calcined dolomite or calcined lime, and at the same time fill the voids in the refractory to a greater or lesser extent.

The dolomite which is used in the brick or the like of the present invention to form the coarse particles may be calcined, dead-burned, sintered, or fused dolomite, of refractory character, herein generically called calcined dolomite. The lime which is used as a raw material in the present invention may be calcined, dead-burned, sintered, or fused lime, herein generically called calcined lime. In many cases the lime may be magnesian lime obtained by calcining magnesian limestone.

If the calcined dolomite or calcined lime is a fine powder, it will be formed into coarse particles suitable for making a refractory brick before mixing with the protective oxide. The formation of the coarse particles may be accomplished by molding, sintering or fusing the calcined dolomite or calcined lime into briquettes or into formless masses. Where molding is used the pressure will in many cases be in excess of 1000 p.s.i., and often in excess of 5000 or 10,000 p.s.i. A bond may be used to make the briquettes or formless masses, suitably an organic bond-like tar or oil, or a ceramic bond-like kaolin or ball clay. The quantity of bond will be any suitable amount, which in many cases may be in the range between 0.25% and 4% by weight. The briquettes or formless masses if they are sufficiently hard when bonded and/or molded may be crushed up to make coarse particles without sintering, but if desired the briquettes or formless masses may first be sintered or fused, suitably at a sufficiently high temperature which may in a particular case be in the range between 900° C. and a temperature of the order of the temperature of fusion.

The briquettes or masses will next be ground to provide coarse particles which will preferably be in the range between 3 mesh and 40 mesh, and in most cases in the range between 3 mesh and 28 mesh. When mesh are referred to herein it is intended to indicate Tyler standard mesh per linear inch. The remainder of the lime or dolomite which passes through the finer screens may be briquetted, molded, sintered and fused again, and reground to form coarse particles as desired.

In making up the final refractory body according to the present invention, the coarse particles of calcined dolomite or calcined lime are mixed with fine particles of a protective oxide. The fine particles will be through 28 mesh and normally through 40 mesh, and in the preferred embodiment will be predominantly through 80 mesh. Very fine particles through 100 mesh or 150 mesh are desirable in some cases. Gap sizing will suitably be used, in which case the coarse particles of calcined dolomite or calcined lime will suitably be coarser than 28 mesh and the fine particles of the protective oxide will preferably be finer than 40 mesh.

The quantity of protective oxide will be in the range between 3 and 20% of the dry weight of the brick or other refractory, and preferably in the range between 5 and 20%. The remainder of the refractory composition of the brick will be the calcined dolomite or calcined lime.

In some cases the refractory raw mix need not include a bond, since the protective oxide itself imparts bonding properties. In other cases a separate bond may be employed, such as an organic bond of the character of tar or oil, or a ceramic bond such as kaolin or ball clay, in percentages in the range between 0.25% and 4% on the weight of the dry finished refractory.

In some cases by using high pressures in excess of 1000 p.s.i. and preferably in excess of 5000 or 10,000 p.s.i. on the final refractory, very good results are achieved.

Alumina is a desirable protective oxide, and it can be used in the form either of chemically pure alumina, or any one of the minerals or other materials which contains a very high content of alumina, such as bauxite.

Aluminum silicate minerals which are very high in alumina may also be used, particularly in small quantities.

Another suitable protective oxide is chromium oxide, which may be employed preferably as refractory chromite.

Another suitable protective oxide is manganese oxide.

Another suitable refractory protective oxide is titanium oxide.

It will be evident that for commercial reasons it may be desirable to add the refractory protective oxide in a form that is not the preferred form. For example, manganese may be added as manganese dioxide, recognizing that oxygen will be given off.

It is important that the refractory brick be stored and brought to the place of installation free from damage by moisture or carbon dioxide. This can be accomplished by producing a vitrified glaze which is resistant to moisture and carbon dioxide, for example by spraying or otherwise coating the outside of the brick or other shape with dry water glass (sodium silicate or potassium silicate) preferably through 100 mesh and then firing to vitrify the glaze. The firing employed may if desired be the firing of the brick, in which case the glaze will be applied before firing the brick, or it may be a post firing after the brick is fired, the post firing suitably being at a temperature of the order of 800–1300° C.

In some cases it is desirable to package the refractory brick in moisture protective packages, as for example of aluminum foil or tin foil, with a joint sealed by polyvinyl chloride adhesive, or in a moisture and carbon dioxide resisting plastic film such as polyvinyl chloride or polyethylene.

Example 1

Dolomite is calcined at a temperature suitably of the order of 800° C., and then optionally sintered at a temperature up to the temperature of fusion.

The briquettes or other masses thus formed are crushed and ground, avoiding moisture and carbon dioxide in order to obtain a source of coarse particles.

A mixture of 85% by weight of coarse calcined dolomite particles thus produced, in the range of particle size between 3 mesh and 28 mesh, is mixed with 15% of particles of chemically pure alumina through 40 mesh.

The mixture is molded into refractory brick at a pressure in excess of 1000 p.s.i., and the brick is fired at a temperature of 1800° C.

Higher refractory molding pressures are suitable, and pressures in excess of 5000 p.s.i. or in excess of 10,000 p.s.i. will be used where desired.

Example 2

The procedure of Example 1 is carried out and the brick is fired at a temperature of 2150° C. This assures the production of a fused network of alumina surrounding the dolomite coarse particles.

Example 3

The procedure of Example 1 is carried out, except that bauxite is used instead of chemically pure alumina, and the brick is fired at 1600° C.

Example 4

The procedure of Example 2 is carried out except that bauxite is used instead of chemically pure alumina and the brick is fired at 1950° C.

Example 5

The procedure of Example 1 is carried out except that an aluminum silicate containing at least 85% of aluminum oxide composition by weight is used instead of chemically pure alumina.

Example 6

The procedure of Example 2 is carried out except that instead of chemically pure alumina, aluminum silicate composition containing in excess of 85% aluminum oxide is used, and the brick is fired at 1950° C.

Example 7

The procedure of Example 1 is carried out, using chromium oxide, $Cr_2O_3$, instead of alumina.

Example 8

The procedure of Example 2 is carried out, using chromium oxide, $Cr_2O_3$, instead of alumina and using a firing temperature of 2100° C.

Example 9

The procedure of Example 1 is carried out, using chromite instead of alumina.

Example 10

The procedure of Example 2 is carried out, using chromite instead of alumina and firing at 2000° C.

Example 11

The procedure of Example 1 is carried out, using manganese dioxide, $MnO_2$, instead of alumina, and firing at 1600° C. Allowance in proportions is made for the fact that the manganese dioxide gives off oxygen in firing.

Example 12

The procedure of Example 2 is carried out, using manganese dioxide, $MnO_2$, instead of alumina and firing at 1800° C. Allowance for elimination of oxygen is made.

Example 13

The procedure of Example 1 is carried out, using titanium dioxide, $TiO_2$, instead of alumina. Allowance for elimination of oxygen is made.

Example 14

The procedure of Example 2 is carried out, using titanium dioxide, $TiO_2$, instead of alumina and firing at 2230° C. Allowance for elimination of oxygen is made.

Example 15

The procedure of Example 1 is carried out, using calcined lime instead of calcined dolomite.

Example 16

The procedure of Example 2 is carried out, using calcined lime instead of calcined dolomite.

Example 17

The procedure of Example 3 is carried out, using calcined lime instead of calcined dolomite.

Example 18

The procedure of Example 4 is carried out, using calcined lime instead of calcined dolomite.

Example 19

The procedure of Example 5 is carried out, using calcined lime instead of calcined dolomite.

Example 20

The procedure of Example 6 is carried out, using calcined lime instead of calcined dolomite.

Example 21

The procedure of Example 7 is carried out, using calcined lime instead of calcined dolomite.

Example 22

The procedure of Example 8 is carried out, using calcined lime instead of calcined dolomite.

Example 23

The procedure of Example 9 is carried out, using calcined lime instead of calcined dolomite.

Example 24

The procedure of Example 10 is carried out, using calcined lime instead of calcined dolomite.

Example 25

The procedure of Example 11 is carried out, using calcined lime instead of calcined dolomite.

Example 26

The procedure of Example 12 is carried out, using calcined lime instead of calcined dolomite.

Example 27

The procedure of Example 13 is carried out, using calcined lime instead of calcined dolomite.

Example 28

The procedure of Example 14 is carried out, using calcined lime instead of calcined dolomite.

Example 29

The procedure of Example 1 is carried out, using 85% of coarse particles, 15% of fine particles, and introducing into the brick an additional 2% of tar on the dry weight.

Each of the above examples, Example 1 to Example 28 inclusive, is similarly carried out, using an additional 2% of tar in the mix.

Example 30

The procedure of Example 1 is carried out, using 80% of coarse calcined dolomite and 20% of alumina through 100 mesh.

Each of the other examples is carried out, using 80% of calcined coarse particles and 20% of fine particles through 100 mesh.

Example 31

The procedure of Example 1 is carried out, using 80% of coarse particles, 20% of fine particles, and introducing into the brick 2 additional parts of tar on the dry weight.

Each of the above examples, Example 1 to Example 30 inclusive, is similarly carried out, using 2 additional parts of tar in the mix.

Example 32

The procedure of Example 1 is carried out, using 90% of coarse particles and 10% of fine particles.

Each of the other examples is carried out, using 90% of coarse particles and 10% of fine particles.

Example 33

The procedure of Example 1 is carried out, using 90% of coarse particles, 10% of fine particles through 100 mesh, and introducing into the brick 2 additional parts of tar on the dry weight.

Each of the other examples is carried out, using 90% of coarse particles, 10% of fine particles through 100 mesh, and using 2 additional parts of tar in the mix.

Example 34

The procedure of Example 1 is carried out making refractory shapes other than brick. Each of the procedures of Examples 1 to 33 inclusive, is carried out, using refractory shapes other than brick.

Example 35

The procedure of Example 1 is carried out, using 70% of coarse particles and 30% of fine particles.

Each of the other examples is carried out, using 70% of coarse particles and 30% of fine particles.

Example 36

The procedure of Example 1 is carried out, except that 28% of alumina fine particles is used along with 2% of heavy petroleum oil. The finished brick is dried at 300° C. and then used in a refractory lining without kiln firing.

The procedure of each one of the other examples is carried out, using 28% of fine particles of protective oxide and 2% of heavy petroleum oil, and drying at 300° C. and using in a refractory lining without kiln firing.

Example 37

The procedure of Example 1 is carried out, except that the mixture instead of being molded is rammed into a refractory bottom for an open hearth furnace and is initially subjected to temperature during firing of the furnace.

The procedure of each one of the other examples is carried out with ramming into a lining and then subjecting the lining to temperature during firing of the furnace.

Example 38

The procedure of Example 1 is carried out and after completion the brick is sprayed with particles of dry water glass and then again fired at 950° C. This creates a resistant vitreous coating which protects the brick against damage from moisture and carbon dioxide during storage and shipment. A very thin layer of the order of a few thousandths of an inch on the surface of the brick is sufficient.

The procedure of each of the above examples is carried out, applying the coating according to this example.

Example 39

The procedure of Example 1 is carried out except that before the brick is fired it is sprayed with dry water glass in finely divided form, suitably through 100 mesh. A coating on the outside of the order of a few thousandths of an inch thickness is obtained. During firing the water glass fuses to form a vitreous coating which serves to protect the brick against moisture and carbon dioxide. The procedure of each of the above examples is carried out applying the coating of Example 39 before firing.

Example 40

The procerure of Example 1 is carried out and after firing the brick is wrapped in an impervious wrapping of aluminum foil, sealed at the joints by polyvinyl chloride adhesive.

The procedure of each of the above examples is carried out, while applying this wrapping.

Example 41

The procedure of Example 1 is carried out, and after firing the brick is wrapped in a sealed, impervious plastic wrapping.

The procedure of each of the other examples is carried out, while applying this wrapping.

When percentages are referred to herein, it is intended to indicate percentages by weight on the dry refractory.

It will be evident that the presence of moisture should be avoided as far as possible, and the operation of producing the refractory brick should be carried out in the absence of carbon dioxide unless a subsequent burning operation is provided which will heat the brick to a temperature sufficient to drive off moisture and carbon dioxide. For mixing purposes, if required, the mix may be softened with a hydrocarbon or organic solvent such as benzene or kerosene.

In view of my invention and disclosure, variations and modifications to meet individual whim or particular need will doubtless become evident to others skilled in the art, to obtain all or part of the benefits of my invention without copying the process and structure shown, and I, therefore, claim all such insofar as they fall within the reasonable spirit and scope of my claim.

Having thus described my invention what I claim as new and desire to secure by Letters Patent is:

The process of making a basic refractory mass, which comprises forming a mixture which consists essentially of refractory of the class consisting of calcined dolomite and calcined lime, having a particle size between 3 and 28 mesh, and from 5 to 20 percent on the dry weight of the refractory mixture of protective oxide of the class consisting of oxides of aluminum, chromium, manganese and titanium of a particle size through 28 mesh, forming the mixture into a refractory body, and firing the refractory body above the temperature of fusion of the protective oxide and below the temperature of fusion of the material of the class consisting of calcined dolomite and calcined lime, whereby to fuse the protective oxide into a protective network which will prevent deterioration of the brick by moisture and carbon dioxide.

References Cited in the file of this patent
UNITED STATES PATENTS

| | | |
|---|---|---|
| 2,076,884 | Ernould | Apr. 13, 1937 |
| 2,231,024 | Pole | Feb. 11, 1941 |
| 2,245,297 | Pitt et al. | June 10, 1941 |
| 2,537,013 | Austin et al. | Jan. 9, 1951 |
| 2,876,122 | Whittemore | Mar. 3, 1959 |
| 2,952,554 | Heuer | Sept. 13, 1960 |